United States Patent
Stephens

(10) Patent No.: US 8,345,549 B2
(45) Date of Patent: Jan. 1, 2013

(54) TECHNIQUES FOR CHANNEL ACCESS AND TRANSMIT QUEUE SELECTION

(75) Inventor: Adrian P. Stephens, Cambridge (GB)

(73) Assignee: Intel Corporation, Santa Clara, CA (US)

(*) Notice: Subject to any disclaimer, the term of this patent is extended or adjusted under 35 U.S.C. 154(b) by 296 days.

(21) Appl. No.: 12/387,615

(22) Filed: May 4, 2009

(65) Prior Publication Data

US 2009/0213865 A1    Aug. 27, 2009

Related U.S. Application Data

(63) Continuation of application No. 10/634,417, filed on Aug. 4, 2003, now abandoned.

(51) Int. Cl.
*H04J 1/16* (2006.01)

(52) U.S. Cl. ......... 370/230; 370/412; 370/341; 370/431

(58) Field of Classification Search ............ 370/230, 370/232, 234, 235, 236, 229, 252, 253, 231, 370/335.21, 335.42, 429, 400, 389, 412, 370/423, 419, 413, 414, 415, 416, 417, 418; 710/51, 52, 53, 54, 55, 56; 709/224, 236
See application file for complete search history.

(56) References Cited

U.S. PATENT DOCUMENTS

| | | | |
|---|---|---|---|
| 4,949,333 A | | 8/1990 | Gulick et al. |
| 5,128,937 A | * | 7/1992 | Khalil ............... 370/440 |
| 5,179,557 A | | 1/1993 | Kudo |
| 5,790,534 A | | 8/1998 | Kokko et al. |
| 7,031,259 B1 | | 4/2006 | Guttman et al. |
| 7,099,346 B1 | | 8/2006 | Kanterakis |
| 7,411,961 B2 | | 8/2008 | Rajkotia |
| 2002/0159385 A1 | * | 10/2002 | Susnow et al. ......... 370/229 |
| 2003/0145095 A1 | * | 7/2003 | Liu et al. .............. 709/230 |

FOREIGN PATENT DOCUMENTS

| | | |
|---|---|---|
| CN | 1331891 A | 1/2002 |
| WO | 2005/018178 A1 | 2/2005 |
| WO | 2008/156402 A1 | 12/2008 |

OTHER PUBLICATIONS

Zarlink Semiconductor, "Applications of the MVTX2800, Programming QoS Register," Feb. 2003. pp. 1-21. XP:002301353, Retrieved from the Internet on Oct. 18, 2004.
International Search Report and Written Opinion received for PCT Application No. PCT/US2004/024276, mailed on Nov. 3. 2004; 14 pages.
International Preliminary Report on Patentability received for PCT Application No. PCT/US2004/024276, mailed on Feb. 16, 2006: 8 pages.

(Continued)

*Primary Examiner* — Kibrom T Hailu
*Assistant Examiner* — Dady Chery
(74) *Attorney, Agent, or Firm* — Scott M. Lane

(57) ABSTRACT

Various embodiments are disclosed for techniques to perform channel access decisions and to select a transmit queue. These decisions may be performed, for example, based upon the age and number of packets in a queue. These techniques may allow a node to improve the length of data bursts transmitted by the node, although the invention is not limited thereto.

16 Claims, 4 Drawing Sheets

Queue Threshold = 3
(as an example)

OTHER PUBLICATIONS

Office Action Received in European Patent Application No. 04757340.7, mailed Mar. 30, 2012, 6 pages.
Extended search report received for European Patent Application No. 10177391.9, mailed on Oct. 25, 2010, 7 pages.
Office Action received for Chinese Patent Application No. 200480022068.4, mailed on Apr. 26, 2011, 12 pages of Chinese Office action including 7 pages of English translation.
Office Action received for Chinese Patent Application No. 200480022068.4, mailed on Mar. 23, 2010, 22 pages of Chinese Office action including 13 pages of English translation.
Office Action received for Chinese Patent Application No. 200480022068.4, mailed on Sep. 26, 2008, 19 pages of Chinese Office action including 11 pages of English translation.
Office Action received for European Patent Application No. 04757340.7, mailed on May 27, 2010, 6 pages.
Office Action received for European Patent Application No. 04757340.7, mailed on Jun. 8, 2007, 5 pages.
Office Action received for Malaysian Patent Application No. PI20043128, mailed on Nov. 21, 2008, 4 pages.

* cited by examiner

TECHNIQUES FOR CHANNEL ACCESS AND TRANSMIT QUEUE SELECTION

CLAIM OF PRIORITY

This application is a continuation of U.S. patent application Ser. No. 10/634,417 filed on Aug. 4, 2003 now abandoned.

BACKGROUND INFORMATION

Network devices may perform a variety of tasks. For example, a device may determine when to access a channel, when to transmit packets over the channel, and how to prioritize the transmission of packets. Some of the current approaches are inadequate, and a need may exist for improved such techniques.

DETAILED DESCRIPTION

Figure 1:
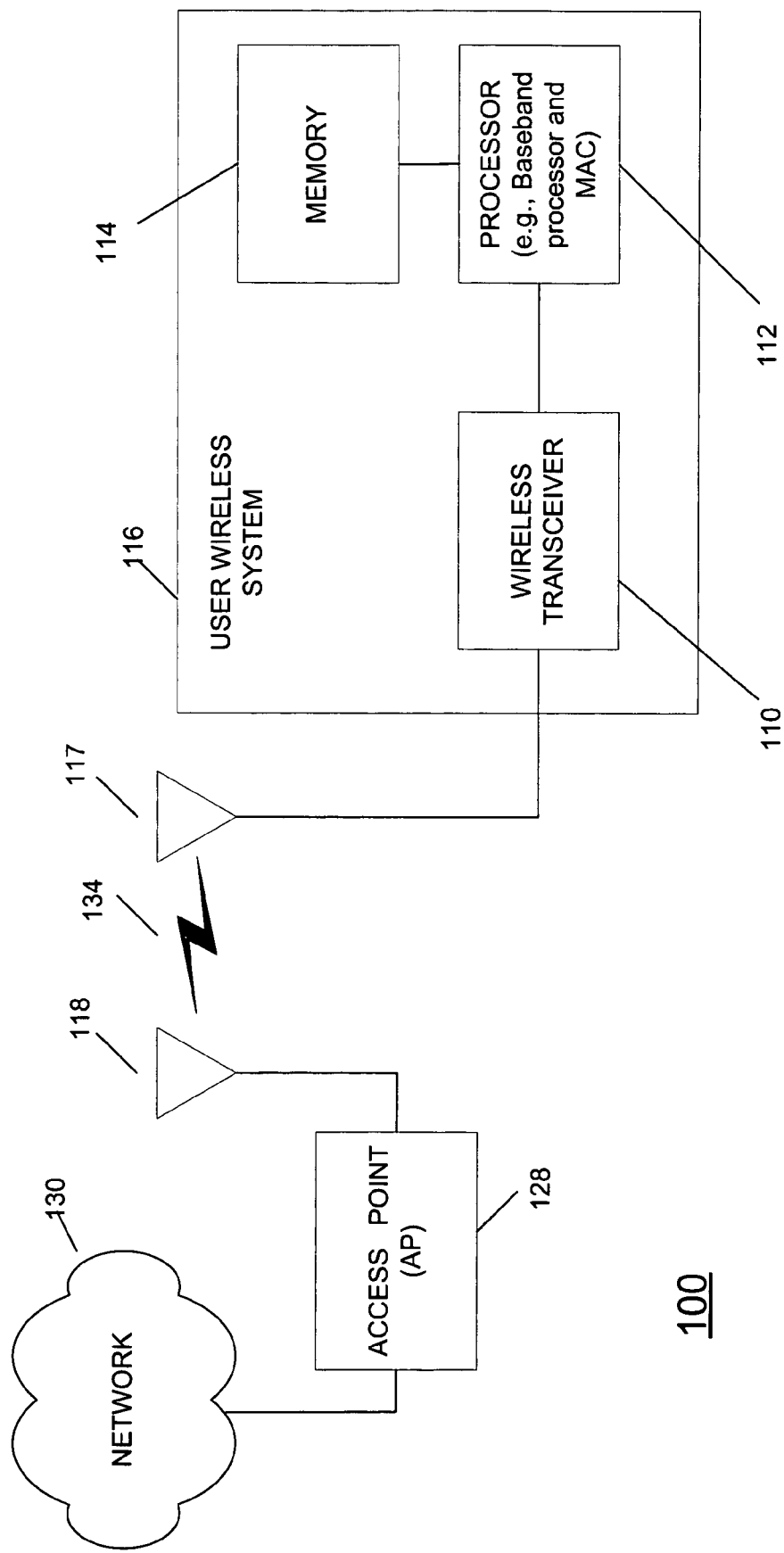
FIG. 1 is a diagram illustrating an example of a wireless communication system in accordance with one embodiment of the invention.

In the detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

A node may refer to any computing system or computing device, such as, for example, a PDA, AP, NIC, wireless device, pager, cellular telephone, switch, gateway, router, computer, handheld computer or device. The node may, for example, communicate with other nodes over one or more channels. The channel may be provided over any communications media, such as a wireless media, or a wired media such as copper line, coaxial cable, fiber optic line, etc.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example. A data block may be any unit of data or information bits. A data burst may, for example, refer to a plurality of packets or a group of data.

Referring to the Figures in which like numerals indicate like elements, FIG. 1 is a diagram illustrating an example of a wireless communication system in accordance with one embodiment of the invention. In the communications system 100 shown in FIG. 1, a user wireless system 116 may include a wireless transceiver 410 coupled to an antenna 117 and to a processor 112. Processor 112 in one embodiment may comprise a single processor, or alternatively may comprise a baseband processor and an applications processor, although the scope of the invention is not limited in this respect. According to one embodiment, processor 112 may include a baseband processor and Medium Access Control (MAC).

Processor 112 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as processor 112, or alternatively some portion or all of memory 114 may be disposed on an integrated circuit or other medium, for example a hard disk drive, that is external to the integrated circuit of processor 112, although the scope of the invention is not limited in this respect. According to one embodiment, software may be provided in memory 114 to be executed by processor 112 to allow wireless system 116 to perform a variety of tasks, some of which may be described herein.

Wireless system 116 may communicate with an access point (AP) 128 (or other wireless system) via wireless communication link 134, where access point 128 may include at least one antenna 118. Antennas 117 and 118 may each be, for example, a directional antenna or an omni directional antenna, although the invention is not limited thereto. Although not shown in FIG. 1, AP 128 may, for example, include a structure that is similar to wireless system 116, including a wireless transceiver, a processor, a memory, and software provided in memory to allow AP 128 to perform a variety of functions. In an example embodiment, wireless system 116 and AP 128 may be considered to be stations in a wireless communication system, such as a WLAN system.

Access point 128 may be coupled to network 130 so that wireless system 116 may communicate with network 130, including devices coupled to network 130, by communicating with access point 128 via wireless communication link 134. Network 130 may include a public network such as a telephone network or the Internet, or alternatively network 130 may include a private network such as an intranet, or a combination of a public and a private network, although the scope of the invention is not limited in this respect.

Communication between wireless system 116 and access point 128 may be implemented via a wireless local area network (WLAN), for example a network which may be compliant with an Institute of Electrical and Electronics Engineers (IEEE) standard such as IEEE 802.11a, IEEE 802.11b, IEEE 802.11g, the standard produced by IEEE 802.11 task group n, and so on, although the scope of the invention is not limited in this respect.

In another embodiment, communication between wireless system 116 and access point 128 may be implemented via a cellular communication network compliant with a 3GPP standard, although the scope of the invention is not limited in this respect.

Figure 2:
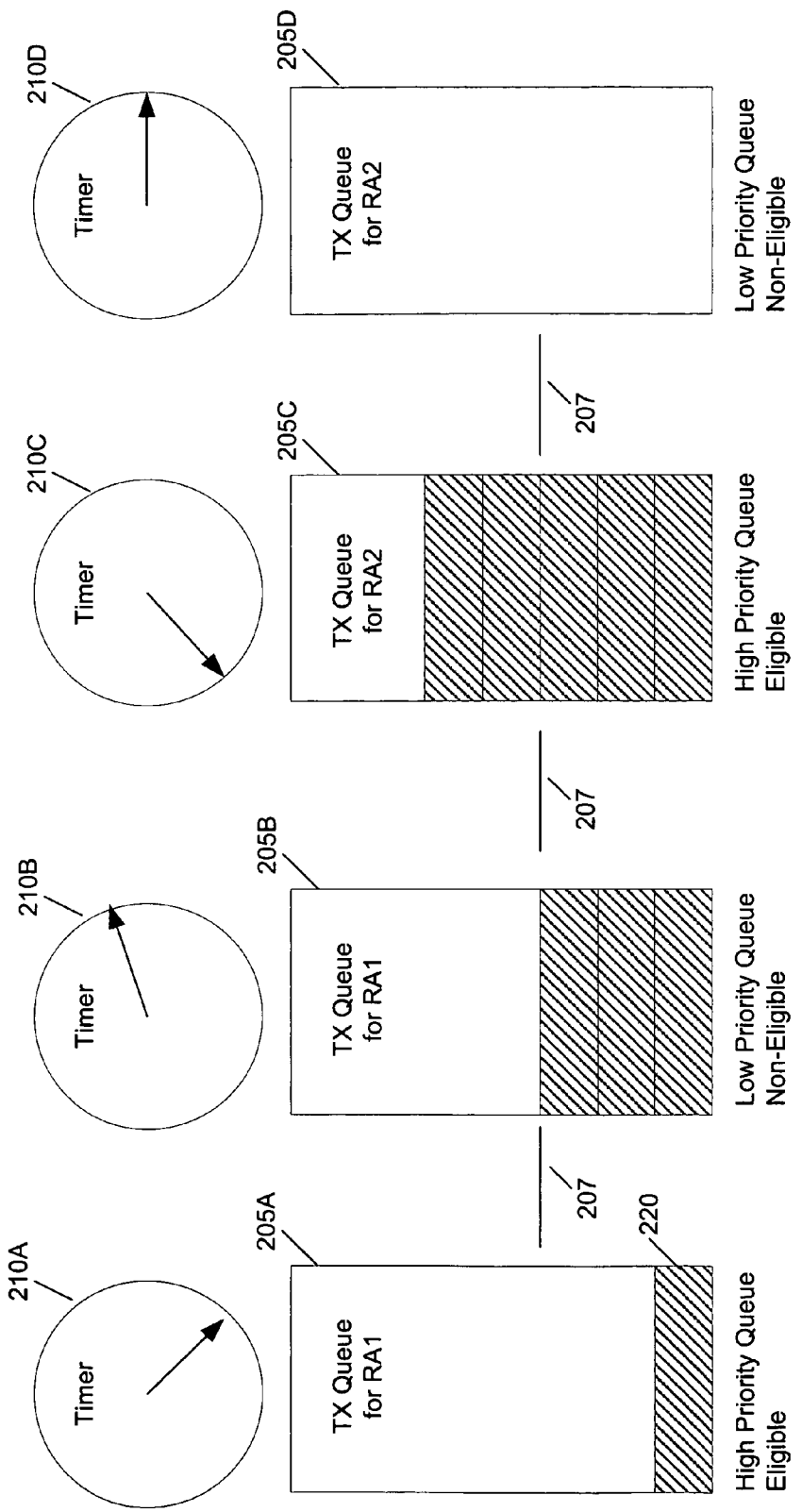
FIG. 2 is a block diagram illustrating transmit queues and timers for a node according to an example embodiment.

FIG. 2 is a block diagram illustrating transmit queues and timers for a node 200 according to an example embodiment. In an example embodiment, a node 200 may include a wireless transceiver, a MAC and processor, and a memory (e.g., see FIG. 1), although the invention is not limited thereto. As shown in FIG. 2, the node 200 may also include at least one transmit queue 205, such as queues 205A, 205B, 205C and 205D, to store data for transmission over a channel. Data 220 may be provided within queues 205. A count for each queue 205 may indicate an amount of data in each queue. For example, as shown in FIG. 2, queue 205A may have a count=1, queue 205B may have a count=3, queue 205C may have a count=5, and queue 205D may have a count=0. The count may refer to, for example, the number of packets, number of bytes, or other measure of data present in the queue.

A timer 210 may be associated with each transmit queue 205 to measure, for example, an amount of time elapsed since a packet (or other data) was stored in the queue. Alternatively, the timer may be set to a selected value and started when a packet is initially received at an empty queue. For example, timers 210A, 210B, 210C and 210D may be associated with transmit queues 205A, 205B, 205C and 205D.

The queues and timers may be logically provided, and may be in any form. The present invention is not dependent upon timers or queues being provided in any particular form. For example, the timer may be provided in hardware, software or a combination of hardware and software. A queue may be provided as a plurality of separate queues, or a single queue with sections allocated for each of queues 205A-D, for example, although the invention is not limited thereto. The queues may take a wide variety of forms.

According to an example embodiment, when a packet is received from a node's MAC, it may be queued in an appropriate queue based upon the receiver address. A receiver address may refer to an address of the entity (e.g., node) that may be the immediate recipient of the transmitted packet (e.g., address of the next hop). The receiver address may be the same as or different from the destination address of the packet, which may refer to a final destination of the packet. For example, the receiver address may be different from the destination address of the packet where the packet may be transmitted via wireless link to an AP (the receiver address or next hop), which may then forward the packet via wired link to a server (the final destination for the packet).

The node may be in communication with at least one other node, and in some cases, node 200 may be in communication with a plurality of other nodes. As a result, packets received from MAC 112 for transmission may include different receiver addresses, depending on the next hop for the packet. According to an example embodiment, the node may include at least one transmit queue 205 per receiver address. In another embodiment, a plurality of transmit queues may be provided for each receiver address, with a different queue provided for each connection with the receiver address (e.g., a different queue for each connection).

According to yet another embodiment, a plurality of transmit queues 205 may be provided in node 200 for each receiver address. In such an example embodiment, a transmit queue may be provided for each of a plurality of different packet priorities for one or more receiver addresses. For example, as shown in FIG. 2, queue 205A may queue high priority packets to be sent to receiver address RA1, while queue 205B may queue low priority packets to be sent to RA1. Similarly, queues 205C and D may queue high and low priority packets respectively for receiver address RA2.

As noted above, according to an example embodiment, when a packet is received from a node's MAC, it may be queued in an appropriate transmit queue based upon the receiver address for the packet. The packet may also be queued based on the priority of the packet, if different queues are provided for different priorities, e.g., for that receiver address. If this is the first packet in the queue 205, then the associated timer 210 may be started.

A channel access may refer to a node's attempt to communicate over the channel, such as to obtain permission to transmit data over the channel. The permission to transmit, once gained, may also be referred to as a transmit opportunity. In an example embodiment, where the channel may be a shared medium, such as a shared wireless channel, a node may listen for an idle, and then wait a random period of time before transmitting. This may be a contention-based channel access, and is simply an example, although the invention is not limited thereto. According to an example embodiment, a successful outcome or result of a channel access may be receipt of a transmit opportunity (e.g., permission to transmit data over the channel), although the invention is not limited thereto. In another example embodiment of channel access, the node may make an explicit request for a transmit opportunity to a device (such as an AP for example) responsible for managing access to the medium. In yet another example embodiment, the node may report the amount of data it has to transmit when requested by an access point. Reporting a non-zero amount may be considered to be an implicit request for channel access, according to an example embodiment, although the invention is not limited thereto.

A node may initiate a channel access in response to different conditions. For example, the node may initiate a channel access: 1) when a transmit queue 205 is non-empty (e.g., upon receipt of a packet in the queue); or 2) delaying the channel access based upon the state of an associated transmit queue 205 and/or the state of an associated timer 210.

According to an example embodiment, either of two events may trigger (or cause the node to initiate) a channel access:
1) expiration of a timer associated with a queue; and
2) addition or storage of a packet to a queue that may cause the count for the queue to exceed a threshold. For example, a threshold 207 shown in FIG. 2 may be count=3. In this example shown in FIG. 2, queue 205B has a count=3. Therefore, the receipt of one more packet in queue 205B may cause a channel access. A threshold may be set per queue, or globally for all or a group of queues in the node.

Figure 3:
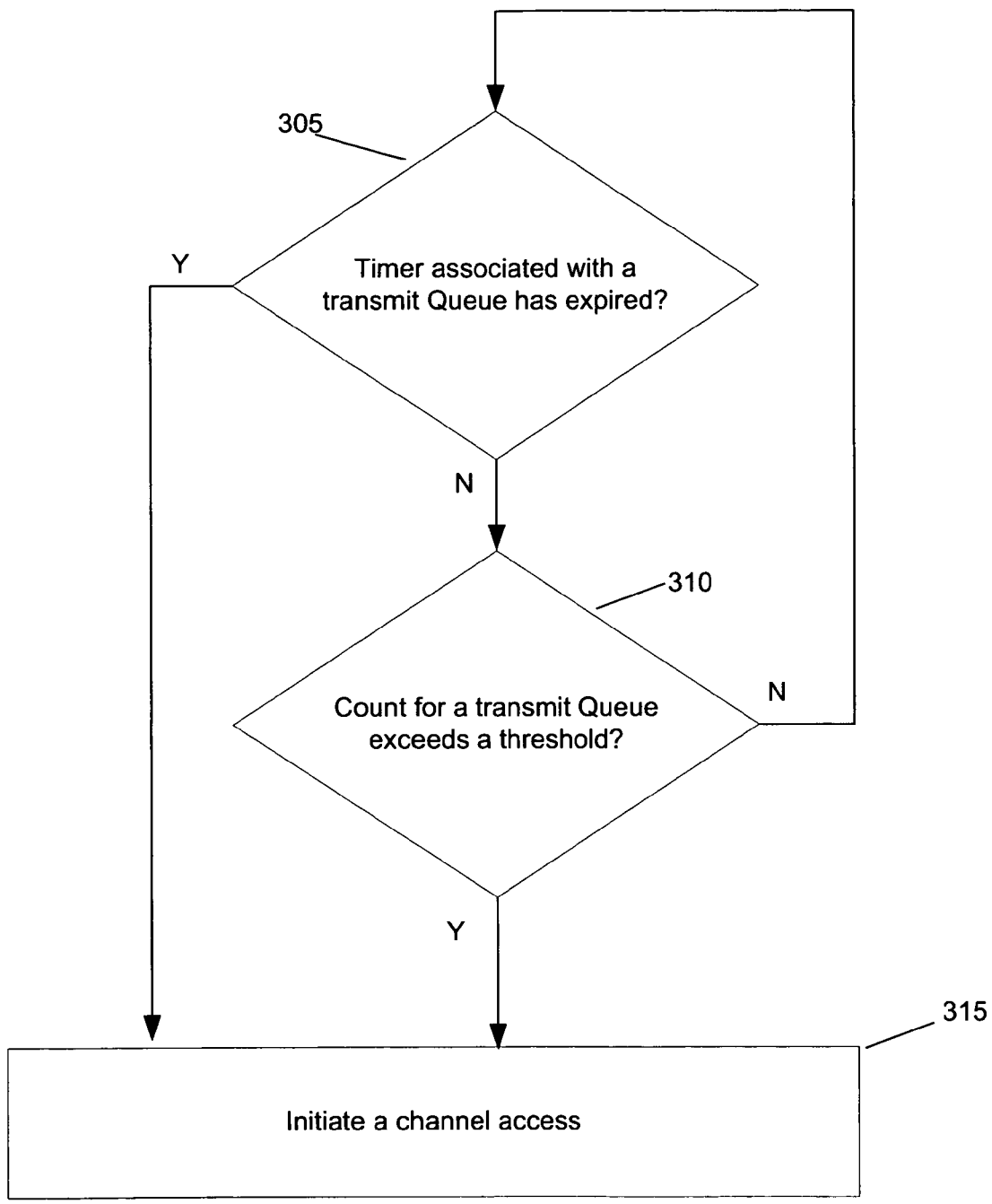
FIG. 3 is a flow chart illustrating operation of a node to determine when to initiate a channel access according to an example embodiment.

FIG. 3 is a flow chart illustrating operation of a node to determine when to initiate a channel access according to an example embodiment. In this example embodiment, a timer 210 may have been started upon receipt of a first packet in a queue 205. At 305, the node 200 may determine whether a timer 210 associated with a transmit queue 205 has expired. If the timer has expired, then a channel access is initiated, 315.

Otherwise, if a timer has not expired, then the node determines whether a count associated with a transmit queue exceeds a threshold, at 310. If the count of a transmit queue exceeds a threshold, then a channel access is initiated, 315. If the count does not exceed the threshold, then the flow returns to 305 and the process repeats.

When a channel access is completed, the node may select a transmit queue from among any eligible transmit queues. Each queue may, for example, be in one of four possible states:
1. Timer has expired (e.g., regardless of threshold and count);
2. Threshold exceeded (example is Queue 205C, FIG. 2)
3. Non-empty queue, but count <threshold (example is Queue 205A, FIG. 2); and
4. Empty (example is Queue 205D, FIG. 2).

In the case where the technique of FIG. 3 is performed to initiate a channel access, there should be at least one queue in state 1 or state 2, since a channel access may not have been initiated in FIG. 3 unless that occurred (e.g., queues in states 3 and 4 may not initiate a channel access in the example embodiment of FIG. 3), although the invention is not limited thereto.

Although not required, according to an example embodiment, a queue may be considered to be eligible or ineligible (non-eligible) based on the channel access rules applicable for the current transmit opportunity. For example, a node may initiate a channel access and receive permission to transmit only high priority packets. Alternatively, a node may implement a policy according to channel access rules that requires high priority packets to be transmitted before low priority packets. In either such case, high priority queues 205A and 205C may be considered eligible since they meet the channel access rules (e.g., for this transmit opportunity or at this time), while low priority queues 205B and 205D are non-eligible (since only high priority packets may be sent right now). This is just one example illustrating eligibility for queues based upon channel access rules, and the invention is not limited thereto.

Figure 4:
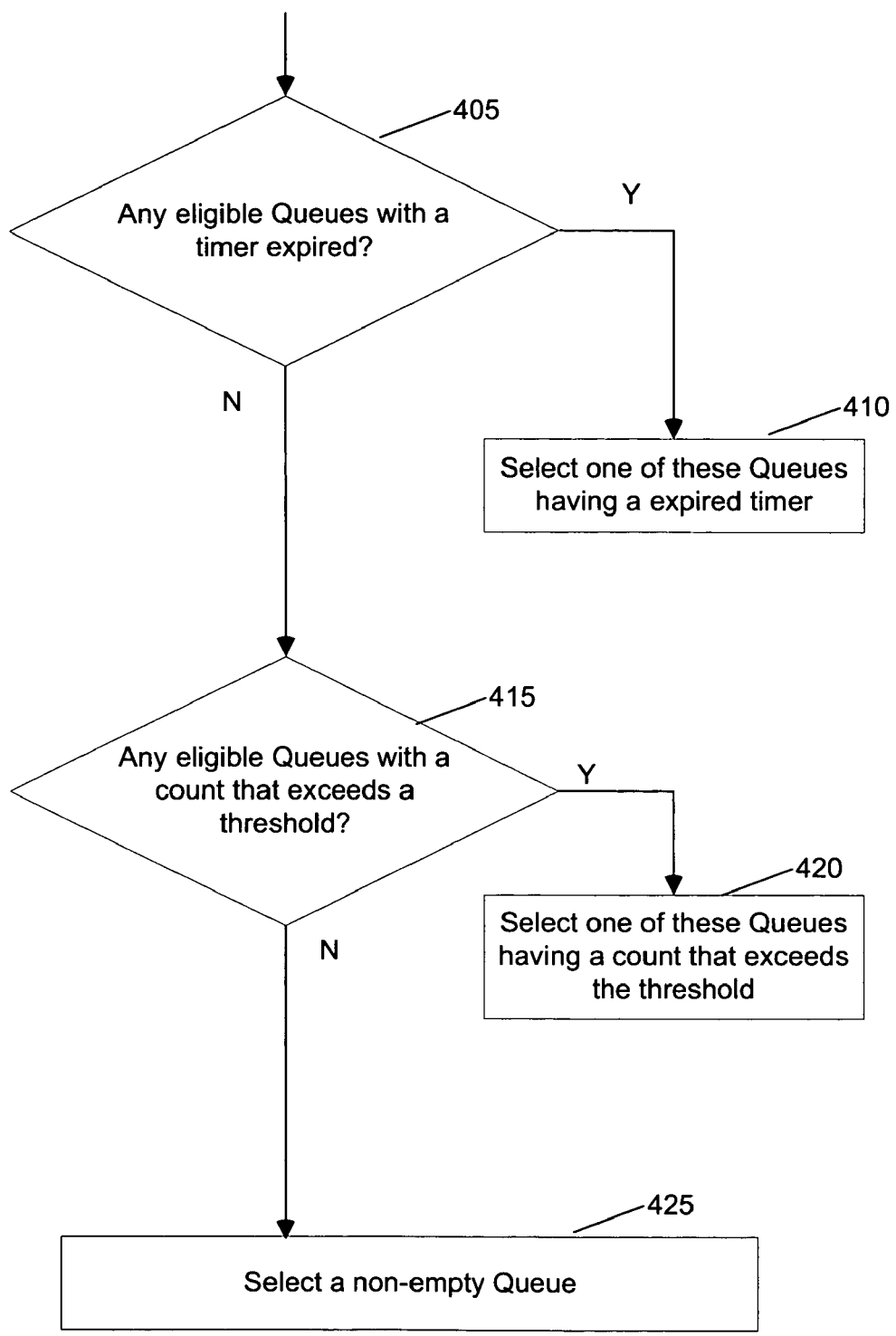
FIG. 4 is a flow chart illustrating operation of a node to select a transmit queue for data transmission from among eligible transmit queues according to an example embodiment.

FIG. 4 is a flow chart illustrating operation of a node to select a transmit queue for data transmission from among eligible transmit queues according to an example embodiment. At 405, node 200 determines if there are any eligible queues with a timer that has expired (timers in state 1). The node first may identify all eligible queues (e.g., all high priority queues if that is what is currently eligible based upon the channel access rules). and then identify which of the eligible queues have an expired timer. If there is, then node 200 selects one of these transmit queues, and then may transmit data from the selected queue.

There may be several different techniques to select one of the eligible queues having a timer expired. For example, depending on the design, node 200 may select: 1) an eligible queue with an expired timer having the oldest data; 2) an eligible queue having a timer that expired the longest ago; 3) an eligible queue with an expired timer having the highest count; or 4) some combination of these.

If there are no eligible queues with a timer expired, then at 415, node 200 determines whether there are any eligible queues that have a count that exceeds a threshold (queue in state 2). If there is, then node 200 selects one of these transmit queues and transmits data from the queue during the transmit opportunity. According to an example embodiment, node 200 may select the eligible transmit queue that has the largest count (e.g., the eligible transmit queue having the most data), although the invention is not limited thereto.

If there are no eligible queues that have a count that exceeds a threshold, then, according to an example embodiment, there may be a non-empty queue (queue in state 3) that is eligible. The node 200 may then select of these non-empty eligible queues, and transmit data from the queue during the transmit opportunity. Therefore, node 200 may give first preference to eligible queues having a timer expired, then a preference to eligible queues having a count that exceeded a threshold, and then to other eligible non-empty queues.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method for accessing a channel comprising:
   determining if at least one transmit queue in a plurality of transmit queues of an access point (AP) is eligible for a transmission opportunity;
   initiating a permission for channel access for at least one eligible transmit queue if:
      a timer associated with the eligible transmit queue has expired, and
      a count associated with the eligible transmit queue has exceeded a threshold;
   assigning a first priority to the eligible transmit queue;
   receiving permission for channel access; and
   transmitting a plurality of packets from the eligible transmit queue after attaining permission for the channel access, wherein each packet of the plurality of packets is assigned the first priority, each packet of the plurality of packets comprising a receiver address and a destination address.

2. The method of claim 1, wherein the plurality of packets is assigned to one receiver address.

3. The method of claim 2, wherein a threshold is set for each transmit queue.

4. The method of claim 2, further assigning a second priority to remaining transmit queues of the plurality of transmit queues, wherein the second priority comprises listening for an idle and waiting a random period of time.

5. The method of claim 1, wherein the receiver address and the destination address is different for at least one packet of the plurality of packets.

6. The method of claim 5, wherein the at least one packet is to be forwarded from the receiver address to the destination address.

7. The method of claim 1, further comprising detecting a first packet stored in an empty transmit queue and starting a timer associated with the first packet stored in the empty transmit queue.

8. The method of claim 1, further comprising storing at least one packet in one of the transmit queues and maintaining a count of the amount of data in the one transmit queue.

9. An apparatus comprising:
   a transceiver;
   a memory comprising a plurality of transmit queues; and
   a processor:
      to determine if at least one transmit queue of the plurality of transmit queues is eligible for a transmission opportunity, wherein each transmit queue corresponds to a receiver address;
      to initiate a permission for channel access for at least one eligible transmit queue if:
         a timer associated with the eligible transmit queue has expired, and
         a count associated with the eligible transmit queue has exceeded a threshold;
      to assign a first priority to the eligible transmit queue;
      to receive permission for channel access; and
      to access a channel for transmission of a plurality of packets over the transceiver after attaining permission for channel access, wherein each packet of the plurality of packets is assigned the first priority, and wherein each packet of the plurality of packets comprises a receiver address field and a destination address field.

10. The apparatus of claim 9, wherein each packet of the plurality of packets is assigned a receiver address and a destination address.

11. The apparatus of claim 10, wherein the receiver address and the destination address is different for at least one packet of the plurality of packets.

12. The apparatus of claim 10, further assigning a second priority to remaining transmit queues of the plurality of transmit queues, wherein the second priority comprises listening for an idle and waiting a random period of time.

13. The apparatus of claim 9, wherein a threshold is set for each transmit queue.

14. The apparatus of claim 13, further comprising initiating a permission for channel access if a count associated with at least one of the transmit queues has exceeded the threshold.

15. The apparatus of claim 9, further comprising detecting a first packet stored in one of the transmit queues and starting a timer associated with the first packet in the transmit queue.

16. The apparatus of claim 9, further comprising storing at least one packet in a transmit queue of the plurality of transmit queues and maintaining a count of packets in the transmit queue.

* * * * *